United States Patent [19]

Küpper

[11] Patent Number: 4,681,230
[45] Date of Patent: Jul. 21, 1987

[54] TUBE TRANSFER DEVICE

[75] Inventor: Wilhelm Küpper, Wegberg, Fed. Rep. of Germany

[73] Assignee: W. Schlafhorst & Co., Monchen-Gladbach, Fed. Rep. of Germany

[21] Appl. No.: 725,015

[22] Filed: Apr. 18, 1985

[30] Foreign Application Priority Data

Apr. 18, 1984 [DE] Fed. Rep. of Germany ....... 3414680

[51] Int. Cl.⁴ .......................... B07C 5/36; B65H 67/06
[52] U.S. Cl. .................................... 209/615; 198/398; 209/651; 209/927
[58] Field of Search ............... 209/606, 651, 652, 653, 209/657, 659, 927, 940, 517, 615; 198/398; 83/909, 923

[56] References Cited

U.S. PATENT DOCUMENTS

| | | | |
|---|---|---|---|
| 1,136,051 | 4/1915 | Ryon | 209/927 |
| 2,355,280 | 8/1944 | Dichter | 209/653 |
| 2,459,309 | 1/1949 | Cotchelt | 209/927 |
| 2,615,566 | 10/1952 | Ball et al. | 198/398 |
| 3,031,059 | 4/1962 | Ingham et al. | 198/398 |
| 3,305,087 | 12/1967 | Lücker | 209/927 |
| 3,618,306 | 11/1971 | Fenstermacher | 198/398 |

FOREIGN PATENT DOCUMENTS

| | | | |
|---|---|---|---|
| 1109066 | 6/1961 | Fed. Rep. of Germany | 209/297 |
| 2149573 | 4/1973 | Fed. Rep. of Germany | 209/927 |

Primary Examiner—Robert B. Reeves
Assistant Examiner—Donald T. Hajec
Attorney, Agent, or Firm—Hebert L. Lerner; Laurence A. Greenberg

[57] ABSTRACT

A tube transfer device for transferring usable tubes from a tube feeding device to a tube receiving device includes an elevator advancing tubes in a given transport direction from the tube feeding device to the tube receiving device is steps with pauses between the steps, the elevator having receiver elements for individual tubes, a feeler element movable back and forth transverse to the given transport direction during the pauses, the feeler element passing over usable tubes and pushing unusable tubes out of the receiver elements, and a receiver device adjacent the elevator for receiving the unusable tubes from the receiver elements.

13 Claims, 4 Drawing Figures

FIG. 1
FIG. 2
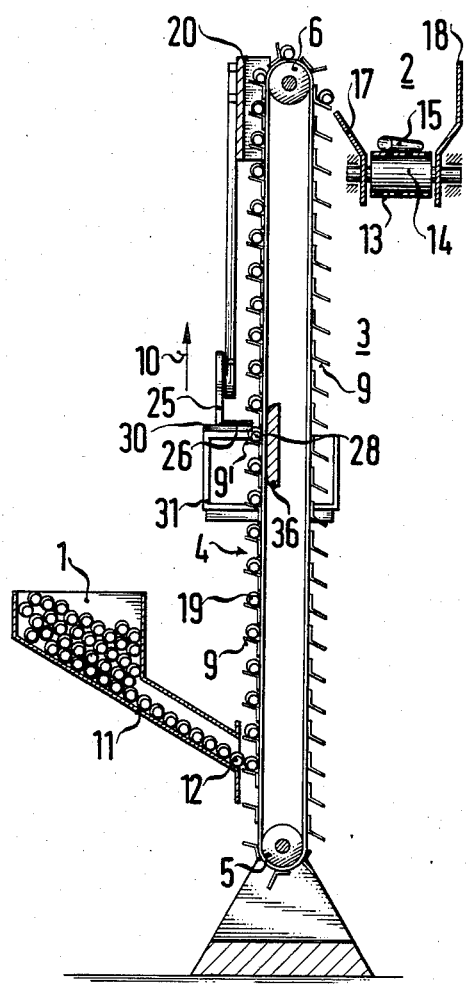
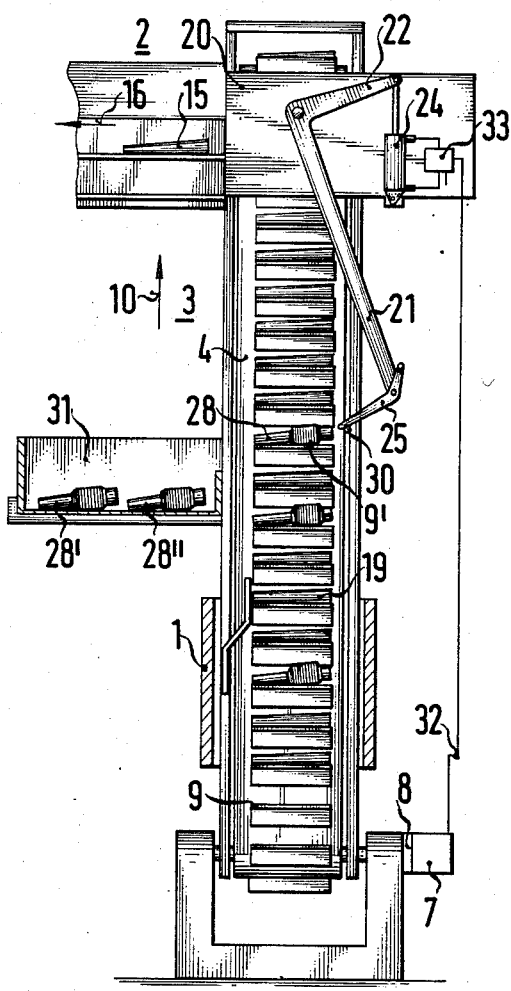

TUBE TRANSFER DEVICE

The invention relates to a tube transfer device for transferring empty tubes from a tube feeding device to a tube receiving device. For example, the tube feeding device may receive the tubes from a winding frame, while the tube receiving device may be a tube collector, a transport belt or another receiving device or the like. The tube receiving device can also belong to a winding or spinning machine, which requires empty tube sleeves for winding bobbins.

The transfer or transport of tubes is not accomplished without difficulty, because among the great number of usable tubes there are always several tubes which cannot be used and which cannot be easily detected. This relates to tubes which may be damaged, or may still carry some remaining windings or, in the case of conical tubes, those having points which are not properly oriented.

It is accordingly an object of the invention to provide a tube transfer device which overcomes the hereinafore-mentioned disadvantages of the heretofore-known devices of this general type, and to make certain that only usable tubes are transferred to the tube receiving device.

With the foregoing and other objects in view there is provided, in accordance with the invention, a tube transfer device for transferring usable or empty tubes from a tube feeding device to a tube receiving device, comprising an elevator advancing tubes in a given transport direction from the tube feeding device to the tube receiving device in steps with pauses or standstill phases between the steps, the elevator having receiver elements for individual tubes, a feeler element movable back and forth transverse to the given transport direction during the pauses or standstill phases, the feeler element passing over usable tubes and pushing unusable tubes out of the receiver elements, and a receiver device adjacent the elevator for receiving the unusable tubes from the receiver elements In accordance with another feature of the invention, the receiver device is alongside the elevator and below the feeler.

Thus, the feeler serves a dual function by first detecting unusable tubes and by second removing these tubes, without any need for a special additional device for this purpose.

In accordance with a further feature of the invention, there is provided a controllable rocker arm having a lower end at which the feeler element is disposed. Such a rocker arm has various advantages. It can perform a pendulum motion which can be easily synchronized with the operating rhythm of the elevator For example, the rocker arm can be disposed and can move,in the space in front of the elevator or in front of the filled receiver elements of the elevator.

In accordance with an added feature of the invention, the feeler includes a follower movable between two of the receiver elements, and an articulating joint connecting the follower to the rocker arm. When the elevator is moving a step forward, the follower is out of the field of motion of the elevator When the elevator stops, the follower can dip between the receiver elements, it can "feel" the condition of the tube, and if it is usable, it can push or remove the tube from the receiver element For example, this is carried out by the way in which the follower touches the tube, travels over its surface, and thereby feels any irregularity, such as protruding tube parts or remaining windings or thread parts, and then drags along the tube while hanging on these irregularities. If there are no such irregularities, the tube remains undisturbed, and may be only slightly displaced by the motion of the follower. The tube is pushed back in place by the return stroke of the follower.

In accordance with an additional feature of the invention, the feeler or follower has a sharp or knife edge oriented transversely to the tubes in the elevator. In this way, the exact elimination of unusable tubes is achieved more reliably. This edge can be disposed in such a way with respect to the follower or striker, that as the follower moves it is always spaced about the thickness of one thread above the surface of the tube. This small distance is just enough to not take along a usable tube. However, if remnants of threads are still on the tube, these remnants or their fibers are detected, and the tube hanging on these fibers is pushed from the receiver element.

In accordance with again another feature of the invention, the operating height of the feeler or follower or edge is adjustable. This adjustability is most of all helpful for accomodating different tubes or tube batches.

In accordance with again a further feature of the invention, the feeler has a rest position and an operating height during operation thereof, and including a support for the feeler or follower being adjustable in height and determining the rest position and the operating height at the beginning of the operation of the feeler. The articulating suspension of the follower on a rocker arm guarantees the reliable repeated movement to this rest position. As the rocker arm begins to move, the follower slides from its rest position, whereby its leading edge can tilt toward the tube, so that its sharp or knife edge becomes effective. This tilting of the follower when leaving its rest position is of special advantage if conically shaped tubes are to be pushed out of the receiver element and the tubes have points which are not properly oriented, i.e. they have bases that are pointed toward the follower The dowanwardly tilted edge of the follower contacts the larger diameter of the foot or base of the tube, but slides over the pointed end which has a smaller diameter. The point at which the follower is acting can be adjusted very accurately by adjusting the height of the support. If the conical tube is positioned accurately, the follower contacts the tube from the top, its front edge therefore slides forward, and it engages possible irregularities on the surface, such as remaining windings on the surface of the tube.

In accordance with again an added feature of the invention, there is included a stop limiting motion of the feeler or follower. This limitation of movement by a stop may be adjustable, and mainly serves the purpose of adjusting the inclined position of the follower to the diameter of the tube a d the conical angle of the tube, so as to make the device more effective.

In accordance with again an additional feature of the invention, the feeler operates in a given direction, and the feeler is formed of a plurality of pivotally supported thin plates ending at a point and forming an acute angle in the given operating direction toward a tube disposed in one of the reveiver elements. With certain types of tubes, this permits the detection of irregularities and the elimination of unusable tubes to succeed more easily.

In accordance with a concomitant feature of the invention, there is provided a straight line guide for the feeler. This is especially useful in case the tubes are cylindrical, or only slightly tapered.

Other features which are considered as characteristic for the invention are set forth in the appended claims.

Although the invention is illustrated and described herein as embodied in a tube transfer device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic, partially cross-sectional side-elevational view of a tube transfer device;

FIG. 2 is a fragmentary, partially cross-sectional front-elevational view of the tube transfer device;

Figure 3:
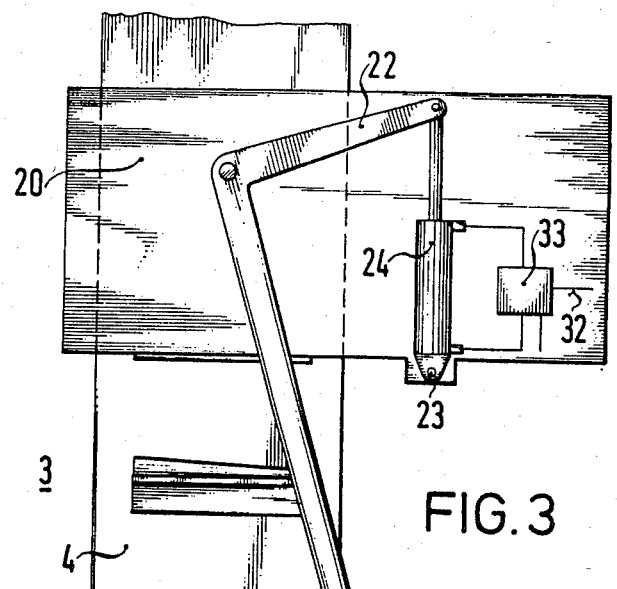
Figure 4:
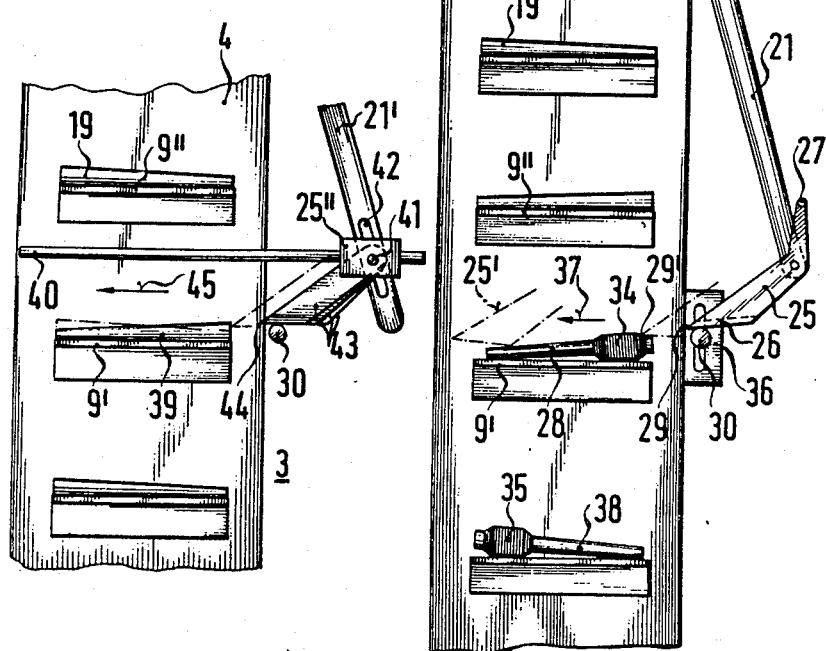

FIG. 3 is an enlarged, fragmentary, front-elevational view of the device shown in FIG. 2; and FIG. 4 is a further enlarged, fragmentary, front-elevational view of an alternate embodiment of a tube sleeve transfer device Referring now to the figures of the drawings as a whole, there is seen a tube transfer device 3 disposed between a tube feeding device 1 and a tube receiving or accepting device 2. The tube transfer device 3 is in the form of an elevator 4. The elevator 4 is constructed in the form of an endless belt, which runs over belt rollers 5 and 6. The roller 5 is driven by an electric motor 7 through a stepping mechanism 8. The stepping mechanism contains a Geneva or Maltese drive, so that the elevator can only advance step by step, in such a way that its receiver elements 9 occupy a predetermined position in space after each step. The direction of transport is indicated by an arrow 10.

The tube feeding device 1 is constructed in the form of a collector box with a channel or chute 11, which is inclined toward the elevator 4. Conical tubes 12 slide through the channel 11 in the direction toward the elevator 4, where they are individually taken along by the receiving elements 9 of the elevator The tube receiving device 2 contains a horizontal, endless transport belt 13, which runs on rollers 14. One tube 15 is already positioned on the transport belt 13. The transport direction is indicated by an arrow 16. Lateral walls 17 and 18 prevent the transported rollers from falling off the transport belt.

The receiver elements 9 of the elevator 4 contain individual tubes 19, as well as other types of tubes which will be further described below.

A rocker arm 21 is pivotally supported at the machine frame which carries the belt roller 6. The rocker arm 21 is conencted to a shifting lever 22. The end of the shifting lever 22 articulates with a pnematic piston-cylinder device 24, which can pivot about a pivot point 23. The rocker arm 21 carries a feeler or sensor 25, which is provided with a plate-shaped follower or striker 26 and is pivotally connected to the rocker arm 21. The movement of the follower 26 is limited by a stop 27. The follower 26 is provided with a cutting edge 29 which is oriented transversely to a tube 28.

The operating height of the feeler 25 and its follower 26 and therefore the operating height of the cutting edge 29 as well, can be adjusted by a support device 30, having an adjustable height. This support device 30 determines the rest position and the working height at the beginning of the sensing or feeling operation. FIGS. 1 and 3 clearly show that the follower 26 can be moved between the receiver elements 9' and 9", to the position where the feeler 25' is shown in FIG. 3.

FIGS. 1 and 2 show that adjacent and alongside the elevator 4 below the feeler 25, are receiving means 31 for the tube 28, which is to be removed from the receiver element 9' and for the tubes 28' and 28", which have already been removed earlier. The receiving means 31 are constructed in the form of a box.

In order to assure the synchronous operation of the elevator 4 and the feeler 25, an operative connection 32 leads from the electric motor 7 to a control valve 33 of the piston-cylinder device 24. Two different operating modes of the tube transfer device 3 will be explained with the aid of FIGS. 3 and 4.

According to FIG. 3, a tube 28 which still carries some remaining windings 34, lies in the receiver element 9'. The vertical position of the support 30 in a slotted plate 36 is adjusted in such a way that the edge 29 encounters resistance at the remaining windings. 34 when it reaches the position 29' shown with dot-dash lines, but would not touch the tube 28 if the tube had no remaining windings In the case at hand, the edge 29 takes along the remaining winding, and therefore also the tube 28, in the direction of an arrow 37. When the feeler 25 has moved to the position 25', the tube has been pushed out from the receiver element 9', and falls into the receiver box 31 shown in FIGS. 1 and 2.

After the feeler 25 has moved back to its starting position, the elevator 4 moves one step forward, so that a tube 38 with its remaining windings 35 moves into the position previously occupied by the tube 28. The conical tube 38 is oriented in the opposite direction from the conical tube 28. After leaving the support device 30, the follower 26 first slides along the surface of the tube 38, until the edge 29 touches the remaining windings, and then also pushes the tube 38 with the remaining winding 35 out of the receiver element.

Tubes which have no remaining windings or other irregularities are not grabbed by the follower 26, regardless of the position and the side to which the point of the conical tube is directed.

The configuration according to FIG. 4 differs from the construction according to FIG. 3 by the provision that the feeler 25" is provided with a straight line guide in the form of a horizontal rod 40, along which the feeler 25" can slide. The feeler 25" is pulled along by means of a pin 41 which is contained in a slot 42 formed in the rocker arm 21'. The feeler 25" is formed of several plates 43 which end at a point 44, which is oriented in a direction 45 at an acute angle towards a tube 39 that is positioned in the receiver element 9' of the elevator 4.

The configuration according to FIG. 4 also differs from the construction according to FIG. 3 by the feature that the height adjustment device of the support 30 is different. The support in this case is located somewhat lower, in particular, so low that the plate 43 contacts a tube 39 which points with its point or head to the left and its base or foot-end to the right, and pushes it out of the receiver element 9'. If the tube 39 were oriented the other way, as indicated by the dot-dash lines, the plate 43 could not contact the tube at its head.

The invention is not limited to the illustrated and described embodiments which were used as examples The foregoing is a description corresponding in substance to German application No. P 34 14 680.6, filed Apr. 18, 1984, the International priority of which is being claimed for the instant application, and which is hereby made part of this application. Any material discrepancies between the foregoing specification and the aforementioned corresponding German application are to be resolved in favor of the latter.

I claim:

1. Tube transfer device for discarding unusable cylindrical and conical tubes and misoriented conical tubes and for transferring empty cylindrical tubes and properly oriented conical tubes from a tube feeding device to a tube receiving device, comprising an elevator advancing tubes in a given transport direction from the tube feeding device to the tube receiving device in intermittent steps with pauses between the steps, said elevator having receiver elements for individual tubes, a feeler element movable back and forth transverse to said given transport direction at an operating height during said pauses, said feeler element passing over empty cylindrical tubes and empty conical tubes oriented in a given direction and pushing unusable cylindrical and conical tubes and conical tubes oriented opposite to said given direction out of said receiver elements, and a receiver device adjacent said elevator for receiving the pushed-out tubes from said receiver elements, said feeler operating in a given direction, and said feeler being formed of a plurality of pivotally supported thin plates ending at a point and forming an acute angle in said given operating direction toward a tube disposed in one of said receiver elements.

2. Tube transfer device according to claim 1, wherein said receiver device is alongside said elevator and below said feeler.

3. Tube transfer device according to claim 1, including a controllable rocker arm having a lower end at which said feeler element is disposed.

4. Tube transfer device according to claim 3, wherein said feeler includes a follower movable between two of said receiver elements, and an articulating joint connecting said follower to said rocker arm.

5. Tube transfer device according to claim 4, wherein said follower has a sharp edge oriented transversely to the tubes in said elevator.

6. Tube transfer device according to claim 5, wherein the operating height of said edge is adjustable.

7. Tube transfer device according to claim 4, wherein the operating height of said follower is adjustable.

8. Tube transfer device according to claim 4, wherein said feeler has a rest position and an operating height during operation thereof, and including a support for said follower being adjustable in height and determining said rest position and said operating height at the beginning of the operation of said feeler.

9. Tube transfer device according to claim 4, including a stop limiting motion of said follower 10. Tube transfer device accoring to claim 1 wherein the operating height of said feeler is adjustable.

11. Tube transfer device according to claim 1, wherein said feeler has a rest position and an operating height during operation thereof, and including a support for said feeler being adjustable in height and determining said rest position and said operating height at the beginning of the operation of said feeler.

12. Tube transfer device according to claim 1, including a stop limiting motion of said feeler 13. Tube transfer device according to claim 1, including a straight line guide for said feeler.

* * * * *